United States Patent Office 3,433,789
Patented Mar. 18, 1969

3,433,789
S-BENZOYLOXYMETHYL-THIAMINES
Raffaello Fusco, Milan, and Franco Tenconi, Monza, Italy, assignors, by mesne assignments, to Warner-Lambert Pharmaceutical Company, Morris Plains, N.J., a corporation of Delaware
No Drawing. Filed Jan. 24, 1967, Ser. No. 611,243
Claims priority, application Germany, Jan. 25, 1966, V 30,222
U.S. Cl. 260—256.5
Int. Cl. C07d 51/42; A61k 15/12
8 Claims

ABSTRACT OF THE DISCLOSURE

By reaction of a metal salt of thiol-form thiamine with an halomethyl ester of benzoic acid or substituted benzoic acid, there are obtained S-benzoyloxy or substituted benzoyloxymethyl thiamine which, also in the form of their non-toxic acid addition salts, show prolonged vitamin $B_1$ activity and are useful as nutritional supplements for foods and animal feedstuffs and for therapeutic purposes.

---

This invention relates to new derivatives of thiol-form thiamine and to a method for their preparation. More particularly, the invention relates to such derivatives which contain a benzoyloxymethyl grouping linked through the sulphur atom of open-form thiamine, these new compounds being represented by the following structural formula:

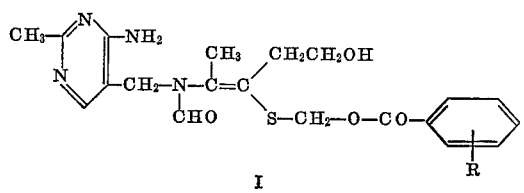

I wherein R represents hydrogen, halogen or a lower alkyl from 1 to 3 carbon atoms. The R substituent may be in any of the available positions of the benzene ring but preferably it is in ortho or para position.

The new compounds are chemically identified as 3-(benzoyloxymethylthio - 4[N(2 - methyl - 4 - amino - 5-pyrimidinomethyl)N - formyl]amino - Δ - (3) - pentenols, but for the sake of brevity, will be named hereinafter S-benzoyloxymethyl-thiamines.

This invention also includes acid addition salts of the above defined compounds with non-toxic pharmaceutically acceptable organic or inorganic acids, for example hydrohalic acids, e.g. hydrochloric, hydrobromic or hydriodic acid, sulphuric, phosphoric, acetic, propionic, lactic, oxalic, succinic, maleic, tartaric, citric, benzoic, mandelic, methanesulphonic and salicylic acids.

The S-benzoyloxymethyl-thiamine derivatives of this invention and their salts possess remarkable vitamin $B_1$ activity, because they are promptly converted to thiamine in the body. Contrary to the thiamine itself which is little absorbed when orally administered, the compounds of this invention are readily absorbed by oral administration and the absorption is substantially proportional to the dosage. Thus the compounds of the invention permit high vitamin $B_1$ levels in blood and organs, and therefore, they may be usefully employed as nutritional supplements for foods and animal feedstuffs and for therapeutic purposes, particularly for the treatment of conditions resulting from vitamin $B_1$ deficiency.

The compounds of this invention can be formulated for administration by oral, parenteral or intraduodenal route together with a non-toxic pharmaceutical carrier.

The compositions may be in dosage unit form containing the active ingredient in an amount from 5 to 250 mg. The administration is advantageously in equal doses one or more times daily to give a daily dosage of from 15 to 1000 mg. and preferably from 30 to 500 mg.

The new S-benzoyloxymethyl-thiamine derivatives of the invention are obtained by reacting a metal salt of thiol-form thiamine with a reagent of the formula:

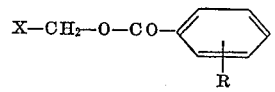

wherein R is as defined above and X is halogen, particularly chlorine.

Among the metal salts of thiol-form thiamine are alkali metal salts, e.g. sodium, potassium, lithium or alkali-earth metal salts or the ammonium salt. Generally the reaction is carried out in an anhydrous organic solvent e.g. benzene, toluene, hexane, methanol, ethanol, isopropanol, diethyl ether, dioxane, tetrahydrofurane or mixtures thereof. The reaction is preferably carried out at a temperature between room temperature and 100° C.; generally the reaction is accomplished after a period of from 3 to 30 hours at room temperature.

The S-benzoyloxymethyl-thiamine derivative which separates at the end of the reaction may be isolated and purified following standard procedures, for example by simple filtration of my evaporation of the solvent and suitable recrystallization. If desired, the S-acyloxymethyl derivatives of Formula I are converted into their non-toxic acid addition salts according to known procedure, for example by reacting the bases with an aqueous or alcoholic solution of the appropriate mineral or organic acid. The hydrochloric acid addition salts are preferred.

The following examples are illustrative of the invention.

EXAMPLE 1

A solution of 3.04 g. of sodium salt of thiol-form thiamine in 30 cc. of anhydrous ethyl alcohol is mixed with stirring at room temperature with 1.70 g. of chloromethyl ester of benzoic acid. Stirring is continued at room temperature for about 3 hours, after which 30 cc. of anhydrous ethyl ether is added. The precipitate so obtained, containing sodium chloride together with the final reaction product, is filtered, then suspended in water and filtered again. The sodium chloride is completely removed from the filter cake by repeated washing with water and the S-benzoyloxymethyl-thiamine is dried under vacuum, washed with anhydrous ethyl ether and crystallized from anhydrous ethyl alcohol. Yield: 2.9 g.; M.P. 194–195° C.

1 g. of this product mixed with an alcoholic solution of hydrochloric acid gives the S-benzoyloxymethyl-thiamine hydrochloride, M.P. 178–180° C. Similarly the hydrobromic, phosphoric, oxalic and citric acid addition salts of S-benzoyloxymethyl-thiamine are obtained.

EXAMPLE 2

By following the same procedure as in Example 1 and treating the potassium salt of thiol-form thiamine with the chloromethyl ester of the o-toluic acid, the S-o-toluyl-oxymethyl-thiamine is obtained, M.P. 164–165° C. This product, mixed with an alcoholic solution of hydrochloric acid, gives the S-o-toluyloxymethyl-thiamine hydrochloride, M.P. 179° C. In the same manner the S-p-tolyloxymethyl-thiamine and the S-m-toluyloxymethyl-thiamine are prepared and converted into their hydrochloric acid addition salts.

EXAMPLE 3

A solution of 5 g. of sodium salt of thiol-form thiamine in 50 cc. of anhydrous ethyl alcohol is mixed with stirring at room temperature with 2 g. of chloromethyl ester of p-chloro benzoic acid. By following the procedure described in Example 1, the S-p-chlorobenzoyloxymethylthiamine is obtained; M.P. 168–170° C. Similarly, by reacting sodium salt of thiol-form thiamine with the chloromethyl ester of p-ethyl-benzoic acid and p-isopropyl-benzoic acid, obtained according to the method of M. Descudé (Chem. Centralblatt, 1902, I, 974, ibid., 1902, II, 933), the S-p-ethyl-benzoyloxymethylthiamine and the S-p-isopropyl-benzoyloxymethyl-thiamine, respectively, are obtained and converted into their hydrobromic acid addition salts.

EXAMPLE 4

Biological tests

The compounds of this invention are readily converted to thiamine by homogenates of animal organs. Table I shows the percent conversion for two representative compounds of the invention when incubated with brain, heart, liver, kidney and intestine homogenates of normal rats. The incubation lasted for an hour at 37° C. and pH 7.4 and S-benzoylthiamine monophosphate was used for comparison purposes.

TABLE I

| Compound | Brain | Heart | Liver | Kidney | Intestine |
|---|---|---|---|---|---|
| S-benzoylthiamine monophosphate | 16 | 22 | 30 | 80 | 43 |
| S-benzoyloxymethyl-thiamine | 86 | 100 | 100 | 100 | 100 |
| S-o-toluyloxymethyl-thiamine | 27 | 86 | 96 | 100 | 100 |

From the table it is readily apparent that the thioethers of the invention are converted to thiamine by the homogenates of different organs in an amount larger than the corresponding S-benzoyl ester.

Vitamin $B_1$ activity was demonstrated in man by administering the products of the invention in a single dose to healthy human beings. The hematic thiamine was measured in samples of blood drawn before the administration of the compounds and 2, 4, 8 and 24 hours after this administration.

In Table II are reported the average values of thiamine determined in every sample and the percent variations from the starting values.

S-benzoyloxymethyl-thiamine hydrochloride was tested in comparison with thiamine hydrochloride, utilised as standard compound.

TABLE II

| Compound | Dose, mg. | Hours after administration | | | | | | | | |
|---|---|---|---|---|---|---|---|---|---|---|
| | | 0 | | 2 | | 4 | | 8 | | 24 |
| | | μg./100 cc. | Percent | μg./100 cc. | Percent | μg./100 cc. | Percent | μg./100 cc. | Percent | μg./100 cc. | Percent |
| Thiamine hydrochloride | 200 | 5.84 | 100 | 6.0 | 102 | 6.6 | 113 | 6.1 | 104 | 5.9 | 100 |
| S-benzoyloxymethyl-thiamine hydrochloride | 100 | 5.84 | 100 | 15.37 | 263 | 13.71 | 234 | 11.53 | 197 | 7.73 | 132 |

From the table above it is readily apparent that the S-benzoyloxy derivatives of the invention possess a higher and more prolonged vitamin $B_1$ activity than that of thiamine hydrochloride administered at a double dose.

We claim:

1. A member selected from the group consisting of chemical compounds of the formula:

[Structural formula: 2-methyl-4-amino-pyrimidin-5-yl-CH₂-N(CHO)-C(CH₃)=C(CH₂CH₂OH)-S-CH₂-O-CO-C₆H₄-R]

in which R is selected from the group consisting of hydrogen, halogen and lower alkyl of from 1 to 3 carbon atoms; and non-toxic pharmaceutically acceptable acid addition salts thereof.

2. The compound having the following formula:

[Structural formula as in claim 1 with R = H (unsubstituted phenyl)]

3. The hydrochloric acid addition salt of the compound claimed in claim 2.

4. The compound having the following formula:

[Structural formula as in claim 1 with R = CH₃ (para position, methyl)]

5. The hydrochloric acid addition salt of the compound claimed in claim 4.

6. The compound having the following formula:

[Structural formula as in claim 1 with R = Cl (para position)]

7. The compound having the following formula:

[Structural formula as in claim 1 with R = CH₃ (meta position)]

8. The compound having the following formula:

[Structural formula with -O-C(=O)-O-C₆H₄-CH₃ group]

References Cited

UNITED STATES PATENTS 3,324,124    6/1967    Murakami et al. ___ 260—256.5

ALEX MAZEL, Primary Examiner.

R. J. GALLAGHER, Assistant Examiner.

U.S. Cl. X.R.

260—476; 424—255